May 12, 1970 A. R. MARTIN 3,512,011

INTEGRATOR CIRCUIT WITH RETARDED RECOVERY TIME

Filed Nov. 23, 1966

INVENTOR
ALLEN R. MARTIN
BY James and Franklin
ATTORNEY 3,512,011
Patented May 12, 1970

1

3,512,011

INTEGRATOR CIRCUIT WITH RETARDED RECOVERY TIME

Allen R. Martin, Central Islip, N.Y., assignor to General Instrument Corporation, Newark, N.J., a corporation of New Jersey Filed Nov. 23, 1966, Ser. No. 596,561
Int. Cl. H03k *4/08*
U.S. Cl. 307—228 12 Claims

ABSTRACT OF THE DISCLOSURE

An integrator circuit in which the output signal is developed at least in part on a capacitor or the like and in which a discharge circuit is provided for that capacitor, the discharge circuit comprising current amplifying means which functions in conjunction with a circuit in shunt with the capacitor to bypass a portion of the available discharge current for the capacitor, thereby to reduce the rate of discharge of the capacitor.

The present invention relates to electric circuitry of the integrator or similar type in which means are provided for reducing the so-called recovery rate and therefore increasing the recovery time.

In circuits of the type under discussion, of which integrator circuits are typical, an output signal is produced which is some function of the input signal, and usually also a function of time. So long as there is an operative input signal the output signal will vary appropriately. When the operative input signal disappears, however, the output signal tends to decay, to return to its original value, and this action is termed "recovery." The output signal is usually produced by charging a condenser or other voltage chargeable means, and the recovery takes place because the condenser or other voltage chargeable means discharges. (The term "charge" and "discharge" are here used arbitrarily, the term "charging" representing either an increase or a decrease in the potential at a given terminal of the condenser or other voltage chargeable means, as dictated by the requirements of a given application.)

It may be desired to retard recovery as much as posible, in order that the output signal shall be as accurate a representation as possible of the desired function of the input signal at all times, instead of only during those times when the operative input signal is present. In other circumstances a particular recovery time may be desired, or one may, in certain instances, wish to be able to control the recovery time in order to produce output characteristics extending over a given range. In the past, however, the basic circuit which produces the desired output signal has had a characteristic recovery time which either could not be varied, or else could be varied only through the use of complex circuitry.

It is the prime object of the present invention to devise a circuit in which the recovery rate of an integrator circuit or the like may be greatly reduced over that which is normally inherent in the circuit proper, thereby greatly extending the recovery time. It is a further prime object of the present invention to provide means for controllably varying the recovery time of an integrator circuit

2 or the like without affecting its normal operative characteristics, such as integration.

There is provided, in the discharge circuit for the condenser or other voltage chargeable means which forms a part of the operative circuit per se, a current amplifying means such as a transistor which acts to bypass some of the available discharging current from the condenser, thereby reducing its rate of discharge. This current amplifying means is preferably rendered inoperative during those periods of time when an operative input signal is present, thus enabling the circuit proper to perform its normal function, the current amplifying bypass means being rendered operative only when it is needed to retard recovery of the circuit. When maximum retardation of recovery is not desired, the current amplifying effect of the current amplifying means can be adjustably degraded.

As here specifically disclosed, the current amplifying bypass transistor has its control electrode connected to the condenser or other voltage chargeable means and has its output electrodes connected in shunt with the condenser in the discharge circuit therefor. A rectifier is connected in shunt with the control circuit of the bypass transistor and in series between the voltage input terminal and the condenser. This rectifier is poled so as to establish a connection between the voltage input terminal and the condenser when an operative input signal is present, that signal being effective to "charge" the condenser, the operative orientation of the rectifier therefore being such as to prevent current flow in the opposite or condenser-discharging direction. Thus when an operative input signal is present the action of the rectifier biases the bypass transistor "off" and establishes a connection between the input terminal and the remainder of the circuit proper so that the latter can function as designed. The rectifier further acts, when the input signal disappears, to bias the bypass transistor "on" and thus enable it to perform its discharge-current-bypassing function, thus retarding recovery of the basic circuit. A resistor may be connected in shunt with the transistor in order to modify its effect; the smaller the resistance value, the less effective will be the bypass transistor, and hence the less recovery retardation will occur. If this resistor is variable it permits the attainment in an exceptionally simple fashion of any desired recovery rate within the range provided by the recovery-retardation circuit.

To these ends, and to such other objects as may hereinafter appear, the present invention relates to an integrator circuit or the like provided with means for retarding the recovery thereof, as defined in the appended claims, and as described in this specification, taken together with the accompanying drawings, in which:

Figure 2:
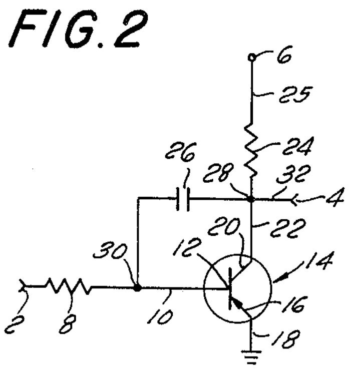
FIG. 2 is a reduced circuit diagram of the integrator circuit proper of FIG. 1.

A typical integrator circuit comprises, as shown in FIG. 2, a signal input terminal 2, a signal output terminal 4 and a biasing voltage terminal 6. The signal input terminal 2 is connected by resistor 8 and lead 10 to the base or control electrode 12 of a transistor generally designated 14. The emitter 16 of that transistor is connected by lead 18 to ground or any reference potential, and the collector 20 thereof is connected by lead 22, resistor 24 and lead 25 to the biasing voltage terminal 6. A condenser 26 or other voltage chargeable means is connected across the base-collector circuit of the transistor 14, between points 28 and 30 on the leads 22 and 10 respectively and between the resistors 24 and 8 respectively and the corresponding terminals of the transistor 14. The voltage output terminal 4 is connected by lead 32 to point 28.

In a circuit of this type, when there is an operative input signal at the voltage input terminal 2 (in the embodiment here disclosed the input signal, the biasing voltage, and the output signal will all be negative with respect to the reference sources) the transistor 14 will be biased so that conduction occurs between its output electrodes 16 and 20. This will cause a charge to build up on condenser 26 and will cause the voltage at output terminal 4 to become progressively more positive as time goes on, that voltage therefore being a function both of the magnitude of the voltage input signal at terminal 2 and time. For a negative input signal, as shown, the output signal voltage $V_o$ at terminal 4 will be represented approximately by the formula $$V_o = V_c - \frac{1}{R_1 C}\int_0^t V_i dt \qquad (1)$$

where $V_c$ is the biasing voltage at terminal 6, $R_1$ is the resistance of resistor 8, C is the capacitance of condenser 26, and $V_i$ is the input signal at terminal 2. (This relationship will obtain when the base-emitter voltage of transistor 14 needed to render the output circuit thereof conductive is very much less than the input signal.) The rate S at which the output signal wil vary, assuming a constant input signal, is represented aproximately by the relationship $$S = \frac{-V_i}{R_i C} \qquad (2)$$

Figure 4:
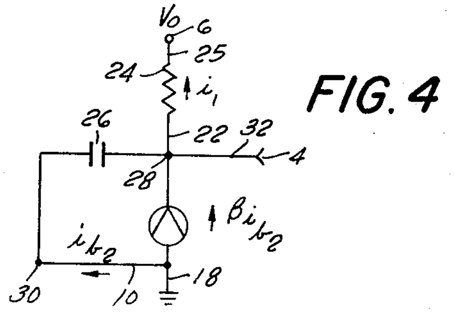
FIG. 4 is an equivalent circuit representation of the basic integrator circuit shown in FIG. 2 during recovery time, the recovery-retardation circuit of the present invention being omitted therefrom.

When the input signal disappears in this integrator circuit the condenser 26 will tend to discharge, a discharge circuit therefor being defined through the base-emitter circuit of transistor 14 and through resistor 24. The equivalent circuit therefor is shown in FIG. 4, the base-emitter current being designated $i_{b2}$ and the emitter-collector current being represented as $\beta i_{b2}$ where $\beta$ represents the current amplification factor of the transistor 14. $i_1$ is the sum of $i_{b2}$ and $\beta i_{b2}$. The recovery or discharging current is $i_{b2}$. Hence $i_{b2}=i_1/(\beta+1)$, and this in turn approximately equals $i_1/\beta$. Since $i_1=(V_c-V_o)/R_3$, where $R_3$ is the resistance of resistor 24, it follows that the recovery current $i_{b2}$ is represented by the relationship $$i_{b2} = (V_c - V_o)/\beta R_3 \qquad (3)$$

In accordance with the instant invention, the left hand end of condenser 26, that is to say, the end thereof opposite from point 28 and voltage output terminal 4, is no longer directly conductively connected to the point 30 on lead 10. Instead it is connected thereto by means of a rectifier 34 which is poled to permit current flow therethrough when an operative signal appears on the voltage input terminal 2 but to prevent current flow therethrough in the opposite direction. The same end of the condenser 26 is connected by lead 36 to the control electrode 38 of a current amplifying means such as the transistor generally designated 40. As specifically disclosed the control electrode 38 thereof is the base, and its output terminals are emitter 42 and collector 44. The emitter 42 is connected by lead 46 to the lead 10, while the collector 44 is connected by lead 48 to point 50 located on lead 25 between the biasing voltage terminal 6 and the upper end of the resistor 24. If desired, a resistor 52 may be connected in shunt with the rectifier 34, and that resistor 52 may, as shown, be variable in resistance magnitude.

Figure 1:
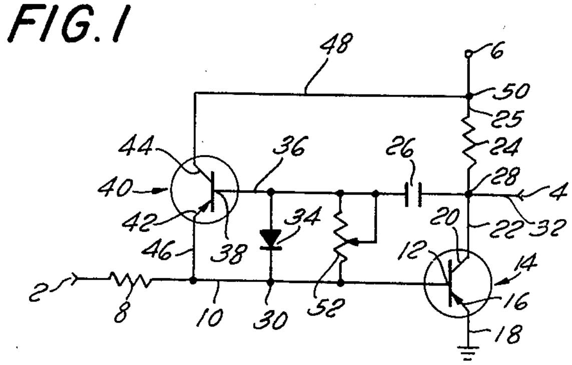
FIG. 1 is a circuit diagram of a preferred form of the invention as embodied in a conventional integrator circuit.
Figure 2A:
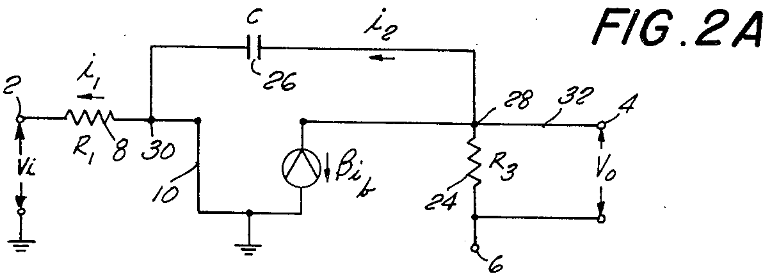
FIG. 2A is the circuit of FIG. 2 shown in equivalent circuit form.

When an operative signal is present at the input terminal 2 the rectifier 34 is, to all intents and purposes, a short circuit. The circuit of FIG. 1 therefore functions substantially as shown in FIG. 2, the base 38 and emitter 42 of the transistor 40 being at substantially the same voltage, thereby biasing the transistor 40 "off" insofar as its output or collector-emitter circuits concerned. Thus operationally there is no essential difference between the circuits of FIGS. 1 and 2 while an operative signal is present at the terminal 2. The equivalent circuit for the operative circuit of FIG. 2 is shown in FIG. 2A, where $i_1$ represents the total current flowing through the circuit, $i_2$ represents that portion of the total current which flows through the upper branch of the circuit and acts to charge the capacitor 26 and $\beta i_b$ represents the current flowing through the lower branch of the equivalent circuit, $\beta$ representing the current amplification factor of the transistor 14. Analysis of the circuit of FIG. 2A will demonstrate that the output voltage will correspond to the relationship (1) expressed above during such time as there is an operative input signal at terminal 2 and taking into account the fact that $\beta$ represents a value of approximately 100 for commercially available transistors.

When the input signal at terminal 2 disappears the connection between condenser 26 and ground via the base-emitter circuit of transistor 14 and rectifier 34 is opened because of the polarity of the rectifier 34, which will not permit current flow in the reverse direction. The recovery or discharging circuit will therefore be that shown in FIG. 3 (assuming that resistor 52 is open-circuited), the equivalent circuit of which is shown in FIG. 3A, in which $i_1$ represents the current flowing through resistor 24, $i_{b2}$ represents the current flowing through the base-emitter circuit of transistor 14 $\beta i_{b2}$ represents the current flowing through the collector-emitter circuit of transistor 14, $\beta$ being the current amplification factor of that transistor 14, $i_{b1}$ represents the current flowing through the base-emitter circuit of transistor 40, and $\beta i_{b1}$ represents the current flowing through the emitter-collector circuit of transistor 40, $\beta$ representing the current amplification factor of transistor 40. (The same value of $\beta$ is employed for the current amplification factors of the transistors 14 and 40 because they are usually the same in a typical circuit, but it will be understood that if transistors of different current amplification factors are employed, the corresponding values would be applicable.) It will be seen that the discharging or recovery current is no longer $i_{b2}$, as was the case in FIG. 4 but is only a portion thereof represented by $i_{b1}$, the remainder thereof—$\beta i_{b1}$—bypassing the condenser 26. Circuit analysis indicates the following relationships:

$$\begin{aligned}
&i_{b2} = (1+\beta)i_{b1} \\
&i_1 = i_{b1} + \beta i_{b2} \\
&i_1 = i_{b1} + \beta(1+\beta)i_{b1} \\
&i_{b1} = i_1/1+\beta(1+\beta) \approx i_1/\beta^2 \\
&i_1 = (V_c - V_o)/R_3 \\
&i_{b1} = (V_c - V_o)/\beta^2 R_3
\end{aligned} \qquad (4)$$

Comparing the value for recovery current in the circuit of FIG. 3A (Equation 4) with the value of recovery current for the circuit of FIG. 4 (Equation 3), it will be apparent that the former is less than the latter by a factor of $\beta$, the current amplification factor of the transistor 40. Since, as has been indicated, in currently available transistors effective for this purpose $\beta$ may equal 100, the use of the instant circuit constitutes a reduction in the charging or recovery current, and hence an increase in the recovery time, by two orders of magnitude.

If even greater reduction in recovery rate is desired, transistors having current amplification factors in excess of 100 could be employed. The same effect can be realized in more conventional fashion by utilizing, in place of the single transistor 40, a pair of transistors connected in a conventional Darlington circuit. As is known, the current amplification of a Darlington circuit is equal to the product of the current amplification factors of the transistors involved. Hence if two transistors each with a $\beta$ of 100 are employed in a Darlington circuit, the resulting current amplification will be $10^4$. Hence the recovery retardation will be enhanced by a similar factor, approximately four orders of magnitude.

Figure 3:
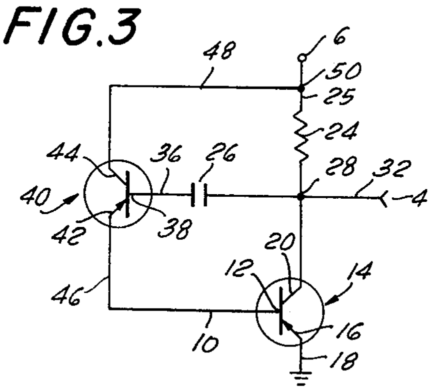
FIG. 3 is a reduced circuit corresponding to FIG. 1 during recovery time and with the resistor in shunt with the rectifier assumed as having an infinitely high value (open circuit)
Figure 3A:
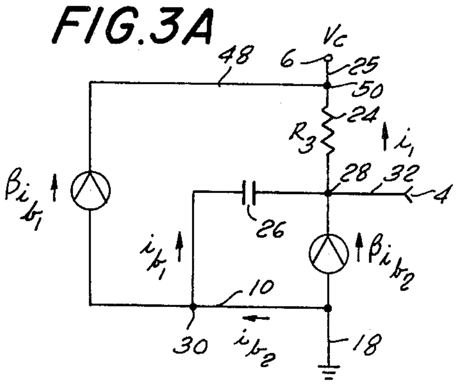
FIG. 3A is the circuit of FIG. 3 shown in equivalent circuit form.

The analysis set forth in FIGS. 3 and 3A has been of an optimum condition in which the optional resistor 52 has been open-circuited or, to consider the matter more generally, has been assumed to have an infinitely high resistance value. If the resistor 52 has a zero resistance value (short circuit) the action of the rectifier 34 will be nullified, and hence the circuit will function in conventional fashion, such as is shown in FIG. 2, with no retardation of recovery. When the resistor 52 is physically employed, therefore having a finite value of resistance someplace between zero and infinity, the amount of retardation recovery produced will be determined by that resistance value—the higher the resistance the more will recovery be retarded, although the relationship is not linear. The action of a resistor 52 permits the circuit of the present invention to be tailored to produce any desired recovery rate between that normally inherent in the integrator circuit proper and that produced by the recovery retardation circuitry when the resistor 52 is open-circuited (has an infinite resistance value).

From the above it will be seen that by means of simple circuitry, which in the embodiment here specifically illustrated involves but a rectifier and a transistor (together with a resistor if desired), means are provided for greatly extending the recovery time of the basic circuit and, when the resistor is employed, for controllably varying that recovery time within limits.

While but a single embodiment of the present invention has been here specifically disclosed, it will be apparent that many variations may be made therein, all within the spirit of the invention as defined in the following claims.

I claim:

1. In a circuit comprising a signal input terminal, a signal output terminal, and circuit means connected to said terminals and effective to cause the voltage at said output terminal to be a function of the voltage at said input terminal, said circuit means including voltage chargeable means connected to said output terminal and a discharge circuit connected to said voltage chargeable means; the improvement which comprises said discharge circuit comprising current amplifying means having control and output circuits, said control circuits being connected to said voltage chargeable means and said output circuit being connected in shunt with said chargeable means, both of said circuits being conductive when said input sign is at a nominal non-charging value, said output circuit functioning to bypass a portion of the available discharge current for said chargeable means in said discharge circuit and hence to reduce the rate of discharge of said chargeable means.

2. In the circuit of claim 1, control means operatively connected to said current amplifying means and to said voltage chargeable means and effective to render the former inoperative when said chargeable means is being charged and to render it operative when said chargeable means is being discharged.

3. The circuit of claim 1, in which said voltage chargeable means comprises a capacitor and said current amplifying means comprises a transistor having a control terminal and two output terminals, said capacitor being connected between said signal output terminal and said control terminal of said transistor.

4. The circuit of claim 1, in which said voltage chargeable means comprises a capacitor and said current amplifying means comprises a transistor having a control terminal and two output terminals, said capacitor being connected between said signal output terminal and said control terminal of said transistor, one of said transistor output terminals being connected to said signal input terminal and the other of said transistor output terminals being connected to said signal output terminal in shunt with said capacitor.

5. The circuit of claim 1, in which said voltage chargeable means comprises a capacitor and said current amplifying means comprises a transistor having a control terminal and two output terminals, said capacitor being connected between said signal output terminal and said control terminal of said transistor, one of said transistor output terminals being connected to said signal input terminal and the other of said transistor output terminals being connected to said signal output terminal in shunt with said capacitor, and a rectifier connected between said transistor control terminal and said one of said transistor output terminals and poled to pass charging current for said capacitor but not to pass discharging current therefor.

6. The circuit of claim 1, in which said voltage chargeable means comprises a capacitor and said current amplifying means comprises a transistor having a control terminal and two output terminals, said capacitor being connected between said signal output terminal and said control terminal of said transistor, one of said transistor output terminals being connected to said signal input terminal and the other of said transistor output terminals being connected to said signal output terminal in shunt with said capacitor, a rectifier connected between said transistor control terminal and said one of said transistor output terminals and poled to pass charging current for said capacitor but not to pass discharging current therefor, and a resistor in shunt with said rectifier.

7. The circuit of claim 6, in which said resistor is variable, thereby to vary the discharge rate of said capacitor.

8. In a circuit comprising a signal input terminal, a signal output terminal, a biasing voltage terminal, and a source of reference potential; a first transistor having a control terminal and two output terminals; an output circuit connected between said biasing voltage terminal and said source of reference potential and comprising a resistor in series connection with said first transistor output terminals, said signal output terminal being connected between said resistor and said first transistor; said signal input terminal being connected to said first transistor control terminal; and a capacitor connected between said signal output terminal and said first transistor control terminal: the improvement which comprises a second transistor having a control terminal and first and second output terminals, said control terminal of said second transistor being connected to the side of said capacitor opposite from said signal output terminal, said first and second output terminals of said second transistor being connected between said signal input terminal and said biasing voltage terminal respectively, the circuit between said control terminal and said first output terminal and the circuit between said first and second terminals being conductive when said signed input is at a nominal non-charging value.

9. In the circuit of claim 8, control means operatlvely connected to said second transistor and to said capacitor and effective to render said second transistor inoperative when said capacitor is being charged and to render it operative when said capacitor is being discharge.d

10. In the circuit of claim 8, a rectifier connected between said signal input terminal and the side of said capacitor opposite from said signal output terminal and poled to pass charging current for said capacitor but not to pass discharging current therefor.

11. In the circuit of claim 10, a resistor in shunt with said rectifier.

12. In the circuit of claim 10, a variable resistor in shunt with said rectifier.

References Cited

UNITED STATES PATENTS

| | | | |
|---|---|---|---|
| 3,189,844 | 6/1965 | MacKenzie | 331—111 |
| 3,256,446 | 6/1965 | Corney | 307—228 |
| 3,286,100 | 11/1966 | Worthington et al. | 328—127 |

FOREIGN PATENTS

| | | |
|---|---|---|
| 652,384 | 4/1951 | Great Britain. |

DONALD D. FORRER, Primary Examiner

J. D. FREW, Assistant Examiner

U.S. Cl. X.R.

307—246; 328—127, 128